(No Model.)
E. P. NEWMAN.
METALLIC HUB FOR VEHICLES.
No. 249,660. Patented Nov. 15, 1881.
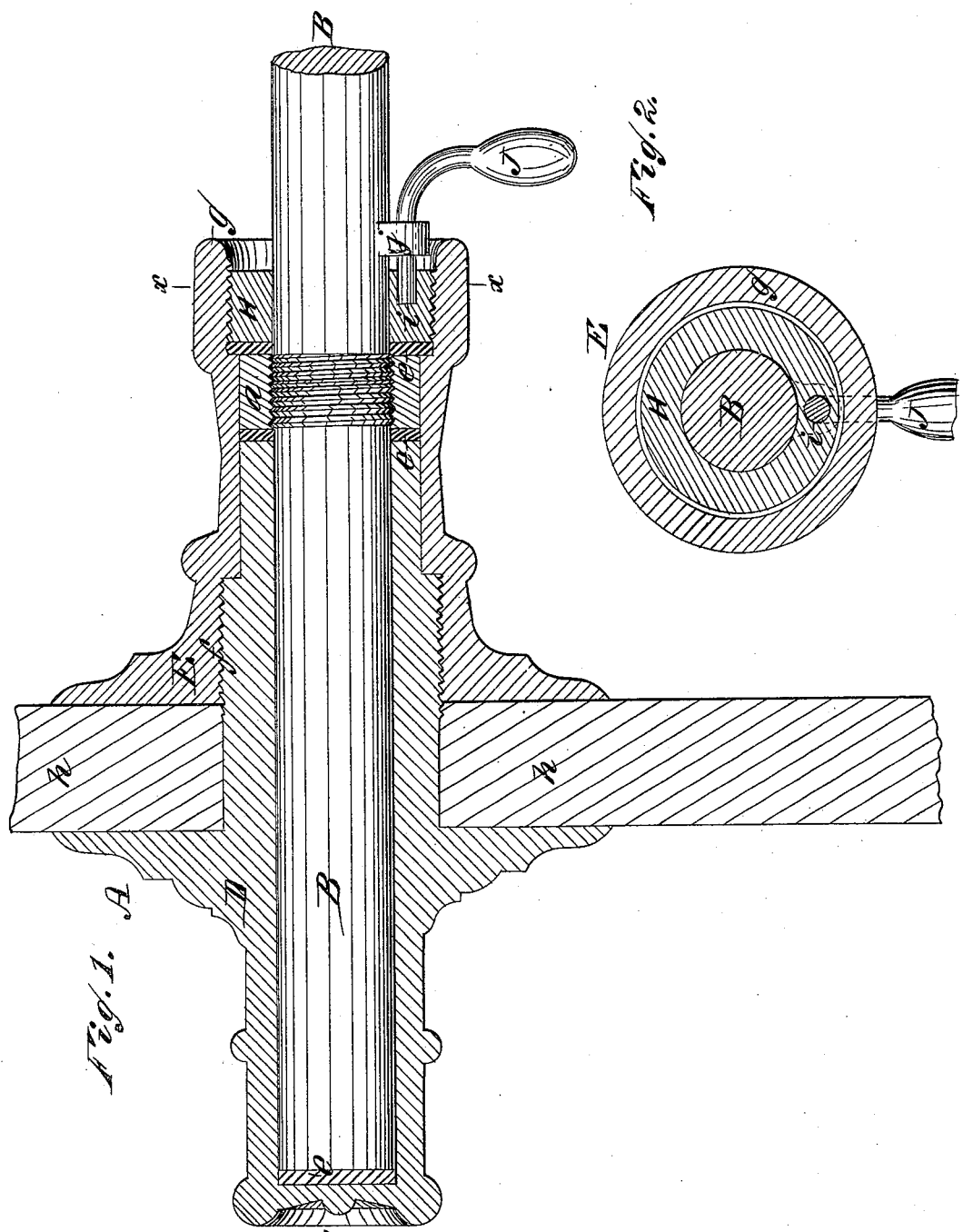
WITNESSES:
Theo. G. Hoster
C. Sedgwick
INVENTOR:
E. P. Newman
BY Munn & Co
ATTORNEYS.

UNITED STATES PATENT OFFICE.

ELMER P. NEWMAN, OF DIMONDALE, MICHIGAN.

METALLIC HUB FOR VEHICLES.

SPECIFICATION forming part of Letters Patent No. 249,660, dated November 15, 1881.

Application filed October 5, 1881. (No model.)

*To all whom it may concern:*

Be it known that I, ELMER P. NEWMAN, of Dimondale, in the county of Eaton and State of Michigan, have invented a new and Improved Metallic Hub for Vehicles, of which the following is a full, clear, and exact specification.

My invention consists of a metallic hub for vehicles having such construction that all escape of oil from the outer end of the axle is prevented, the hub being of cheap and simplified construction and adapted to be held upon the axle by a nut and collar fitted upon the axle at the rear end of the hub.

Reference is to be had to the accompanying drawings, forming part of this specification, in which similar letters of reference indicate corresponding parts in all the figures.

Figure 1 is a longitudinal sectional elevation of my improved hub as it appears when placed upon the axle, and Fig. 2 is a cross-sectional elevation taken on the line $x\ x$ of Fig. 1.

A represents the wheel, and B represents the axle, which latter is provided with the fixed collar $a$. The hub of the wheel is formed of the main forward flanged section, D, and the removable flanged section E. The section D is cast with its outer end entirely closed, as shown at $d$, and is formed with the threaded enlarged portion $f$, upon which the section E is adapted to be screwed for securing the spokes $h\ h$ between the flanges of the sections, as shown. The rear end of the section E is formed with the enlargement $g$, which is internally screw-threaded for receiving the threaded nut H, which is placed loosely upon the axle back of the fixed collar $a$, for holding the wheel on the axle.

To prevent unnecessary friction and noise of the parts, I place the washers $e$, of leather or similar material, between the nut H and the collar $a$, and between the opposite side of the collar and the rear end of the section D, and also between the end of the axle and the closed end $d$ of the hub.

In order to remove the wheel from and replace it upon the axle it will be understood that the nut H should be held stationary by some means, so that by turning the wheel forward or back the same will be turned upon or off from the nut. The means I prefer to use for this purpose is to provide the axle with the fixed lug $j$, which is perforated for the passage of the end of the bent rod J, the end of which is adapted to enter the hole $i$ made in the nut, as shown in Fig. 1.

By this construction the wheel may be removed from the axle for oiling and replaced without the necessity of handling the nut with the hands, and the forward end of the hub being entirely closed, the annoyance and loss due to the escape of oil at the end of the axle, as with hubs of ordinary construction, is entirely overcome; and, furthermore, all dust and grit is entirely excluded from the axle-bearings. Besides, the hub is cheap and light and presents a nice appearance, and the space between the flanges of the sections of the hub being continuous, the spokes may be easily put in without reducing their size at the inner ends, and should a spoke get broken it can be easily removed and its place supplied with a new one without the necessity of springing the spoke into place, as is the case with ordinary hubs. The space between the flanges D and E are wider at the bottom than at the outer edge, so as to better retain the spoke.

Having thus fully described my invention, I claim as new and desire to secure by Letters Patent—

1. The combination, with the axle B, provided with the collar $a$, the closed section D, and the removable section E, having internally-screw-threaded rear end, of the loose nut H, substantially as and for the purpose set forth.

2. The axle B, provided with the collar $a$ and the perforated lug $j$, in combination with the wheel A and loose nut H, provided with the hole $i$, substantially as and for the purposes set forth.

3. The flanged section D, closed at its outer end and formed with the threaded enlargement $f$, in combination with the removable section E, formed with the internally-threaded enlargement $g$, the loose nut H, and the fixed collar $a$, substantially as and for the purposes set forth.

ELMER PORTER NEWMAN.

Witnesses:
ELIAS UNDERHILL,
D. M. HOUGH.